US012791049B2

(12) United States Patent
Oh et al.

(10) Patent No.: US 12,791,049 B2

(45) Date of Patent: Nov. 10, 2026

(54) TWO-STEP CLIP FOR A VEHICLE COMPONENT

(71) Applicant: GM Global Technology Operations LLC, Detroit, MI (US)

(72) Inventors: Sungho Oh, Incheon (KR); Myungsang Kim, Seoul (KR); Yong-Kyu Kim, Incheon (KR)

(73) Assignee: GM Global Technology Operations LLC, Detroit, MI (US)

( * ) Notice: Subject to any disclaimer, the term of this patent is extended or adjusted under 35 U.S.C. 154(b) by 96 days.

(21) Appl. No.: 18/765,227

(22) Filed: Jul. 6, 2024

(65) Prior Publication Data

US 2026/0009415 A1 Jan. 8, 2026

(51) Int. Cl.
*F16B 5/06* (2006.01)

(52) U.S. Cl.
CPC .................................... *F16B 5/06* (2013.01)

(58) Field of Classification Search
CPC ........................................................ F16B 5/06
See application file for complete search history.

(56) References Cited

U.S. PATENT DOCUMENTS

| | | | | |
|---|---|---|---|---|
| 11,994,160 | B2 * | 5/2024 | Berres | F16B 5/065 |
| D1,049,841 | S * | 11/2024 | Buczynski | D8/395 |
| 2006/0168773 | A1 * | 8/2006 | Smith | B60R 13/0206 24/295 |
| 2012/0272487 | A1 * | 11/2012 | Cooley | F16B 19/1081 24/289 |
| 2020/0164816 | A1 * | 5/2020 | Dickinson | F16B 5/0657 |
| 2020/0339044 | A1 * | 10/2020 | Dickinson | F16B 5/065 |
| 2024/0101047 | A1 * | 3/2024 | Dickinson | B29C 45/14344 |

* cited by examiner

*Primary Examiner* — David M Upchurch

(74) *Attorney, Agent, or Firm* — Honigman LLP; Matthew H. Szalach

(57) ABSTRACT

A clip comprising one or more first arms extending from one or more feet at a first end and joining a head at a second end, one or more second arms coupled to the head and extending toward the first end, one or more third arms coupled to the head and arranged laterally between the one or more second arms, the one or more third arms extending toward the first end, and one or more pairs of laterally offset prongs joined to the feet at the first end and extending toward the second end.

20 Claims, 7 Drawing Sheets

TWO-STEP CLIP FOR A VEHICLE COMPONENT

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to devices for fastening objects and, more particularly, to a fastener clip assembly for insertion into an engagement structure.

A number of devices and fasteners are currently available for fastening panels, such as body panels and automobile interior trim piece panels, to a body of a vehicle. A body panel refers to, for example, any interior or exterior body panel on a vehicle, a plastic interior trim piece, a door panel, a headliner or any interior trim piece. Additionally, the body panel may be any suitable exterior body panel, such as a fender, bumper, quarter panel or door panel. The body panel is sometimes referred to more generally as a hard trim panel or a soft trim panel, for example. The body of the vehicle may include any substrate, plate, body panel, structural framework, body component or subcomponent, wall or any suitable object.

In some instances, fasteners used in attaching a body panel to a body of a vehicle can require a large amount of force to install due to interference with seals or other components. Accordingly, a need exists for an improved fastener for use in attaching a body panel to a body of a vehicle to ensure ergonomic assembly requirements are met. Shortcomings of existing fasteners are addressed by one or more aspects of the present disclosure.

SUMMARY

In one configuration, a clip is provided and includes one or more first arms extending from one or more feet at a first end and joining a head at a second end, one or more second arms coupled to the head and extending toward the first end, one or more third arms coupled to the head and arranged laterally between the one or more second arms, the one or more third arms extending toward the first end, and one or more pairs of laterally offset prongs joined to the feet at the first end and extending toward the second end.

The clip may include one or more of the following optional aspects. For example, the one or more first arms may extend continuously between the one or more feet. The one or more feet may extend laterally between the one or more first arms.

According to at least one aspect, the one or more second arms are cantilevered with respect to the head and are configured to move inwardly toward an opening between the one or more feet.

According to another aspect, the one or more second arms each further include a first segment including a proximal end coupled to the head, a second segment coupled to the first segment and including a distal end, and a first retention feature arranged where the first segment joins the second segment. The first segment, the second segment, and the first retention feature define a continuous first engagement surface.

According to at least one example, the one or more third arms each further include a first section including a proximal end coupled to the head, a second section coupled to and extending from the first section, a third section coupled to the second section and including a depressed portion and a distal end, and a second retention feature arranged where the second section joins the third section. The first section, the second section, the third section, and the second retention feature define a continuous second engagement surface.

According to another example, the one or more second arms are configured to inhibit removal of the clip with respect to an engagement structure and the feet are configured to stop the clip against the engagement surface when the clip is inserted into the engagement structure past a portion of the one or more third arms.

According to at least one example, the one or more first arms, the one or more second arms, and the one or more third arms each move substantially independent from one another.

In another configuration, a hard trim assembly is provided and includes a panel comprising at least one blade and at least one clip arranged on the at least one blade. The at least one clip including one or more first arms extending from one or more feet at a first end and joining a head at a second end, one or more second arms coupled to the head and extending toward the first end, one or more third arms coupled to the head and arranged laterally between the one or more second arms, the one or more third arms extending toward the first end, and one or more pairs of laterally offset prongs joined to the feet at the first end and extending toward the second end.

The hard trim assembly may include one or more of the following optional aspects. For example, the one or more second arms each further include a first segment including a proximal end coupled to the head, a second segment coupled to the first segment and including a distal end, and a first retention feature arranged where the first segment joins the second segment. The first segment, the second segment, and the first retention feature define a continuous first engagement surface.

According to at least one aspect, the one or more third arms each further include a first section including a proximal end coupled to the head, a second section coupled to and extending from the first section, a third section coupled to the second section and including a depressed portion and a distal end, and a second retention feature arranged where the second section joins the third section. The first section, the second section, the third section, and the second retention feature define a continuous second engagement surface.

In yet another configuration, a vehicle is provided and includes a vehicle body including one or more openings, a panel comprising at least one blade, and at least one clip arranged on the at least one blade. The at least one clip includes one or more first arms extending from one or more feet at a first end and joining a head at a second end, one or more second arms coupled to the head and extending toward the first end, the one or more second arms having a first retention feature, one or more third arms coupled to the head and arranged laterally between the one or more second arms, the one or more third arms extending toward the first end and having a second retention feature, and one or more pairs of laterally offset prongs joined to the feet at the first end and extending toward the second end.

The vehicle may include one or more of the following optional aspects. For example, the one or more second arms each further include a first segment including a proximal end coupled to the head and a second segment coupled to the first segment and including a distal end, the first retention feature being arranged where the first segment joins the second segment. The first segment, the second segment, and the first retention feature define a continuous first engagement surface.

According to at least one aspect, the one or more third arms each further include a first section including a proximal end coupled to the head, a second section coupled to and extending from the first section, and a third section coupled to the second section and including a depressed portion and a distal end. The second retention feature is arranged where the second section joins the third section. The first section, the second section, the third section, and the second retention feature define a continuous second engagement surface.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
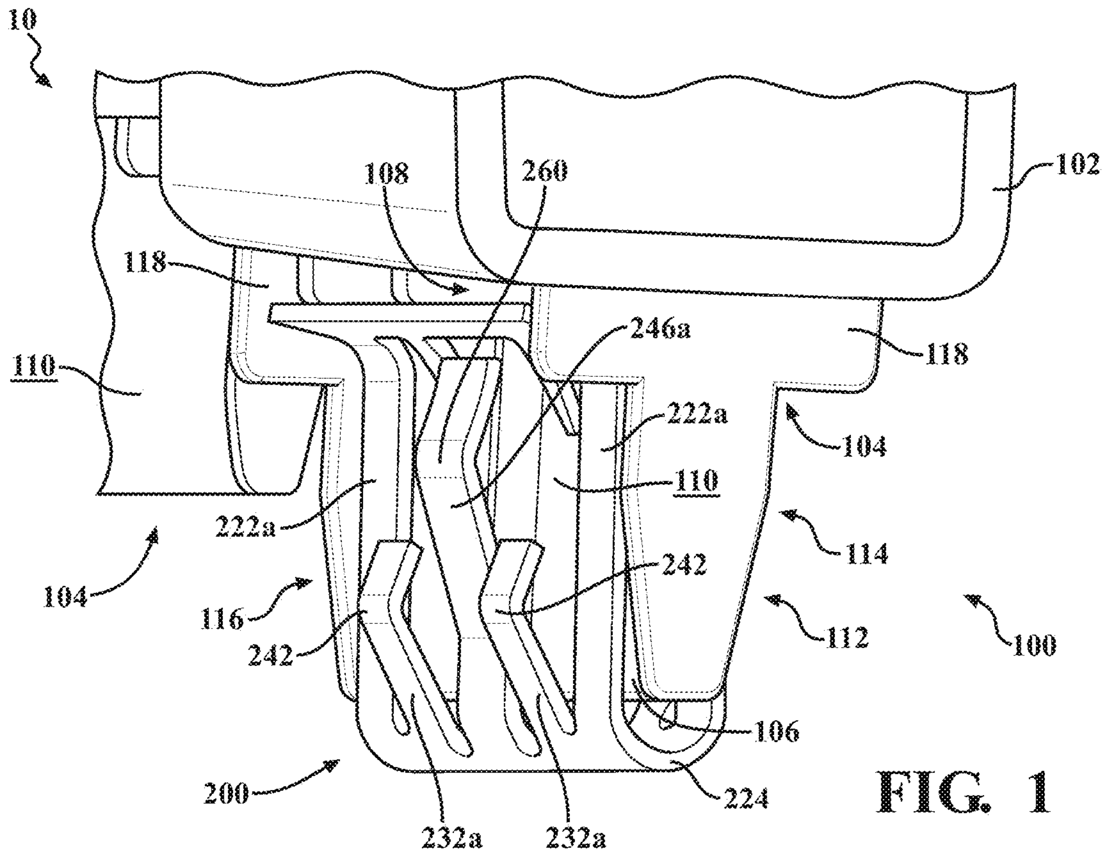
FIG. 1 is a perspective view of a portion of a hard trim assembly of a vehicle including a two-step clip according to principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Figure 4:
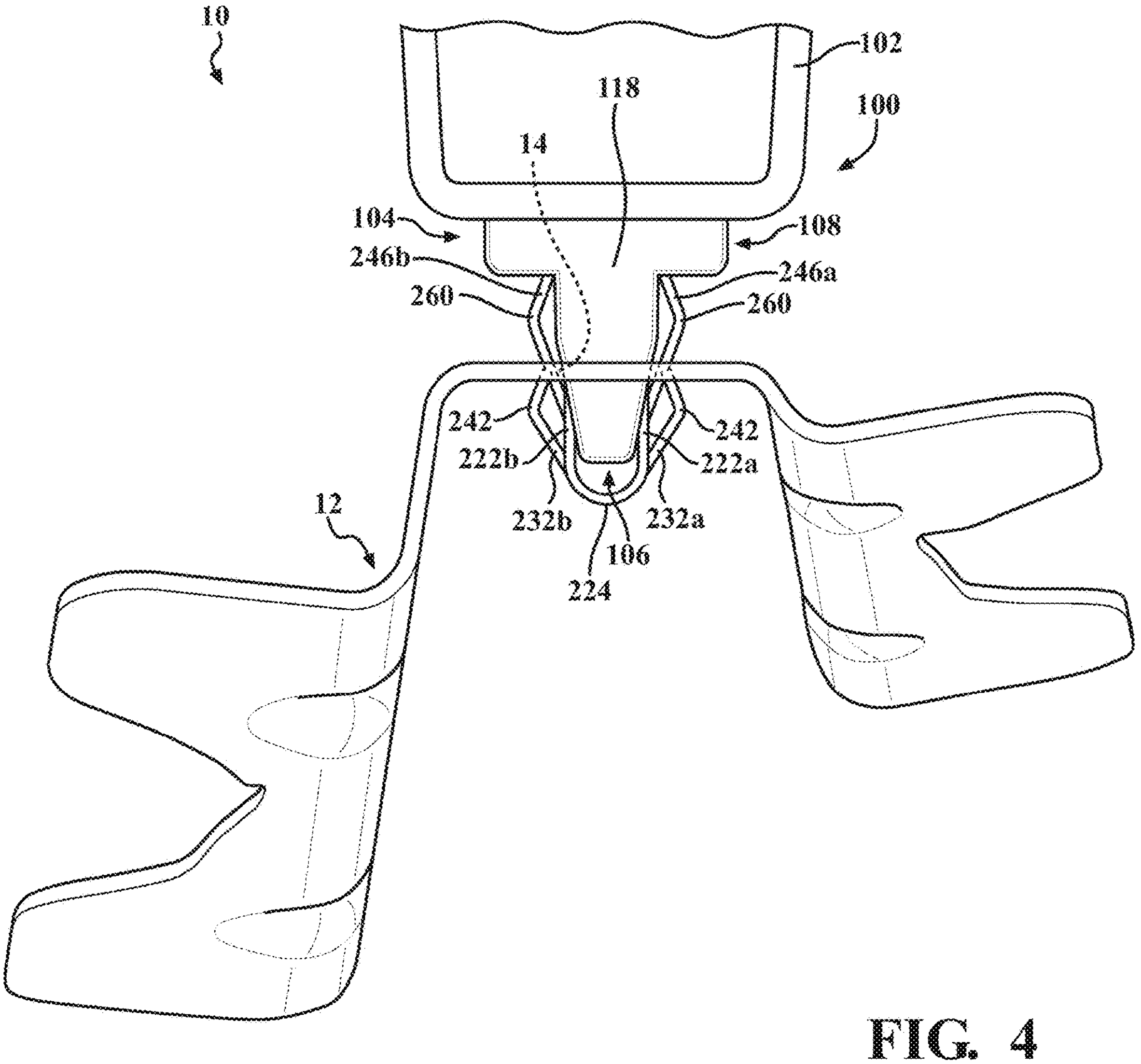
FIG. 4 is an end view of the hard trim assembly of FIG. 1 where a first step of the clip is arranged past an opening of a vehicle component.

With reference to FIG. 1, an assembly of a vehicle 10, such as a hard trim assembly 100, is provided. The hard trim assembly 100 includes one or more fasteners or clips 200 that can be affixed to a portion of a panel 102, such as one or more blades 104. The one or more clips 200 may be referred to as the clip 200 or the clips 200 throughout the disclosure. The clips 200 are desirable for arranging hard trim, soft trim, or another vehicle component with respect to an engagement structure of the vehicle 10, such as a body 12 (FIG. 4). According to one aspect, the clip 200 can be configured as a two-step clip having a third-hand feature that holds the hard trim assembly 100 in a first position with respect to one or more apertures or openings 14 until arrangement or installation of one or more seals 16 (FIG. 8) is completed. Typically, single step or one step clips require a significant amount of force to install in the openings due to interferences with one or more seals, for example. Here, the clip 200 is configured so that users (e.g., operators) do not have to apply forces that exceed ergonomic requirements to arrange the clip 200 with respect to the vehicle 10.

With continued reference to FIG. 1, the blades 104 each include a distal end 106 and a proximal end 108 spaced axially from the distal end 106. As shown in FIG. 1, the proximal end 108 is coupled to and projects from the panel 102. A first surface 110 and a second surface 112 can extend between the proximal end 108 and the distal end 106. The first surface 110 and the second surface 112 can extend laterally between a first end 114 and a second end 116. Guides or end plates 118 can be arranged on or are coupled to the first end 114 and the second end 116. The guides 118 can help laterally align the clip 200 on the first surface 110 and the second surface 112, for example.

Figure 2:
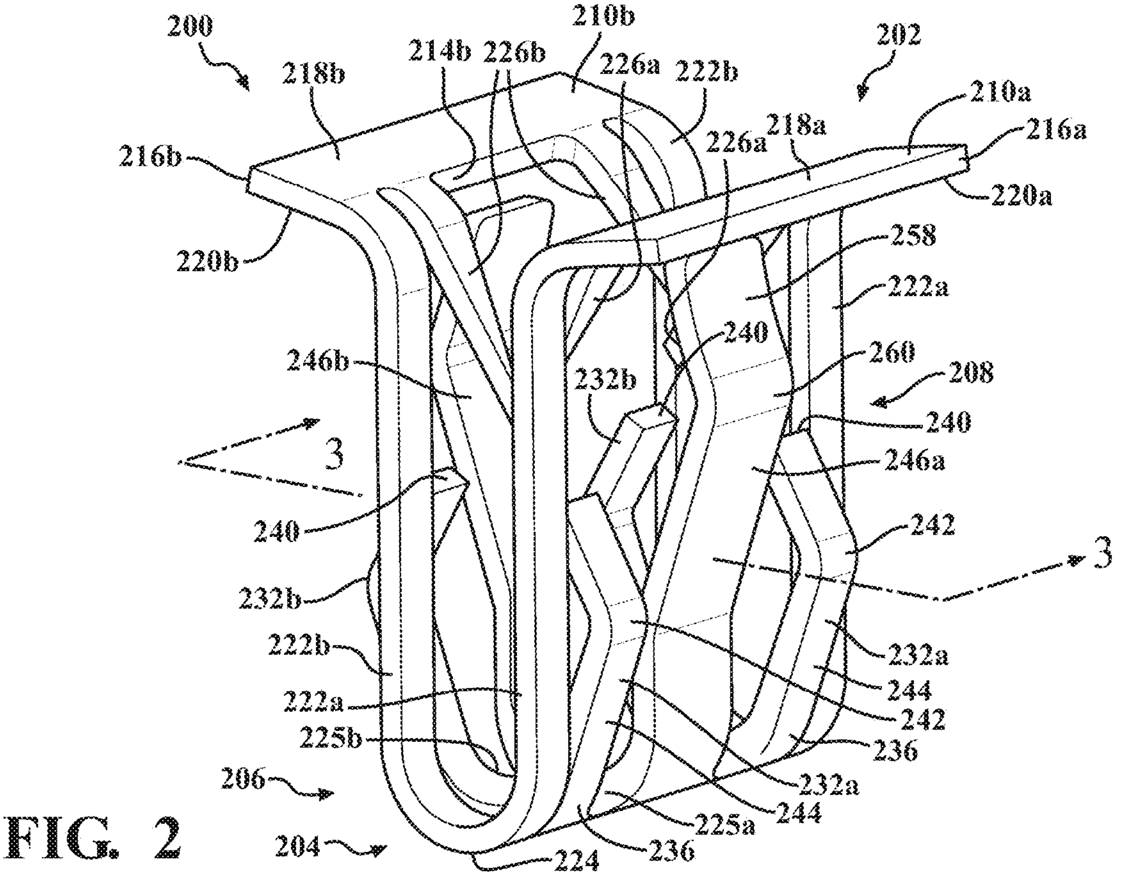
FIG. 2 is a perspective view of the two-step clip of FIG. 1.
Figure 3:
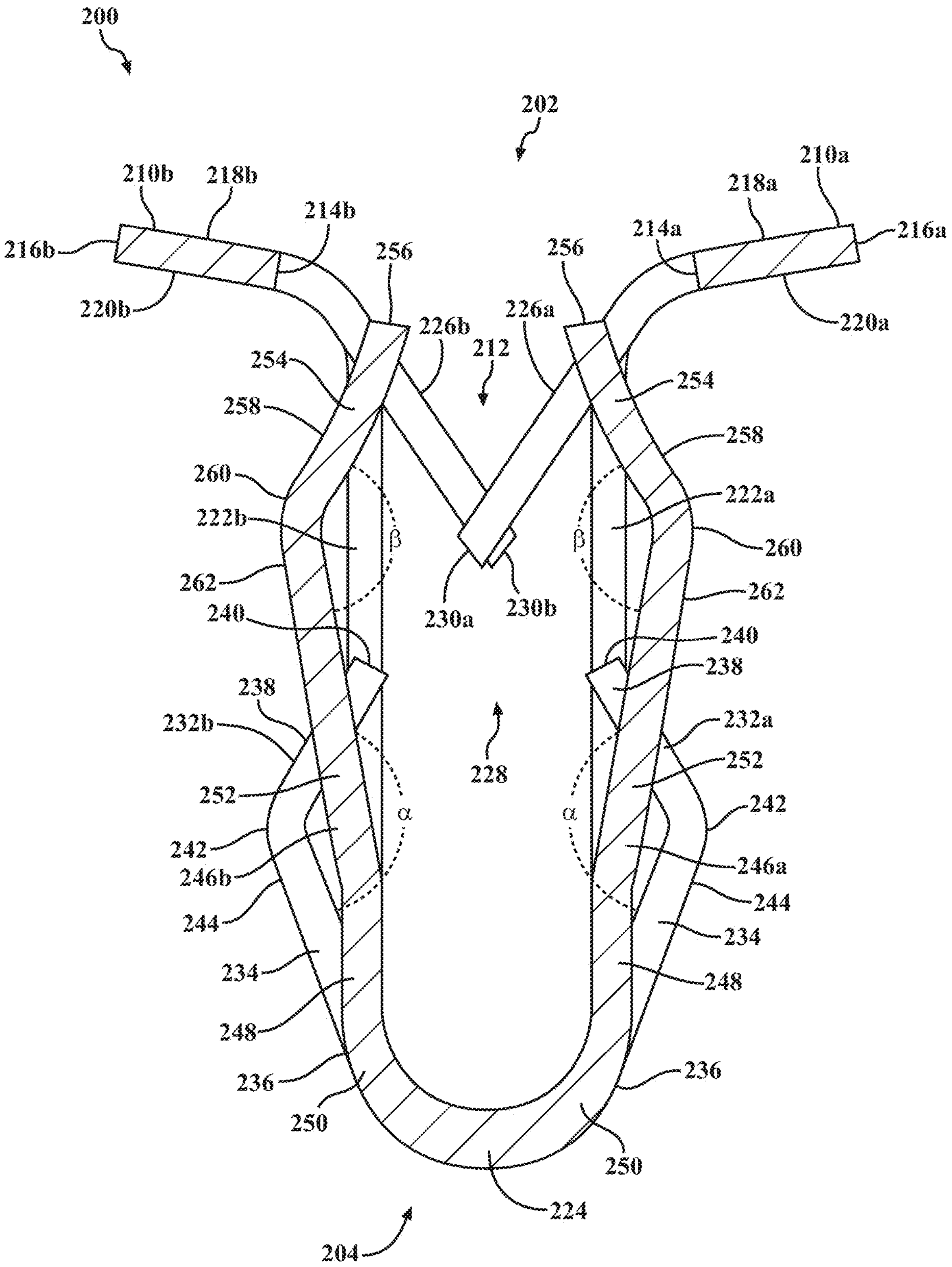
FIG. 3 is a cross-sectional view of the two-step clip of FIG. 2 taken along Line 3-3 of FIG. 2.

With reference to FIGS. 2 and 3, the clip 200 includes a first or upper end 202 and a second or lower end 204 spaced axially from the first end 202. The clip 200 also includes a first side 206 and a second side 208 that is spaced laterally from the first side 206. The clip 200 includes one or more feet 210, such as a first foot 210*a* and a second foot 210*b*. The first foot 210*a* and the second foot 210*b* are also referred to as the feet 210 throughout the disclosure. As shown in FIG. 2, the first foot 210*a* and the second foot 210*b* are spaced from one another and define an opening 212. With reference to FIG. 3, each of the feet 210 includes a first or inner surface 214*a*, 214*b* that respectively faces the opening 212. Additionally, each of the feet 210 includes a second or outer surface 216*a*, 216*b* that is spaced from the inner surfaces 214*a*, 214*b* and faces away from the opening 212. The feet 210 each have an upper surface 218*a*, 218*b* that faces away from the second end 204 and an opposite lower surface 220*a*, 220*b* that faces toward the second end 204. The upper surfaces 218*a*, 218*b* and the lower surfaces 220*a*, 220*b* each extend laterally between the first side 206 and the second side 208 of the clip 200.

With continued reference to FIGS. 2 and 3, one or more first arms 222*a*, 222*b* (i.e., the first arms 222) are coupled to and extend from the feet 210. Particularly, the first arms 222 are respectively coupled the inner surfaces 214*a*, 214*b* of the feet 210 and extend toward and join a head 224 at the second end 204. More particularly, the one or more first arms 222*a* can join a first surface 225*a* of the head 224 that faces the first end 202 of the clip 200. Likewise, the one or more first arms 222*b* can join a second surface 225*b* of the head 224 that faces the first end 202 of the clip 200. As shown in FIG. 2, the first arms 222*a*, 222*b* can be coupled to the head 224 and continuously extend between the first foot 210*a* and the second foot 210*b*. Additionally or alternatively, the first arms 222*a*, 222*b* can further define the first side 206 and the second side 208 of the clip 200.

Figure 5:
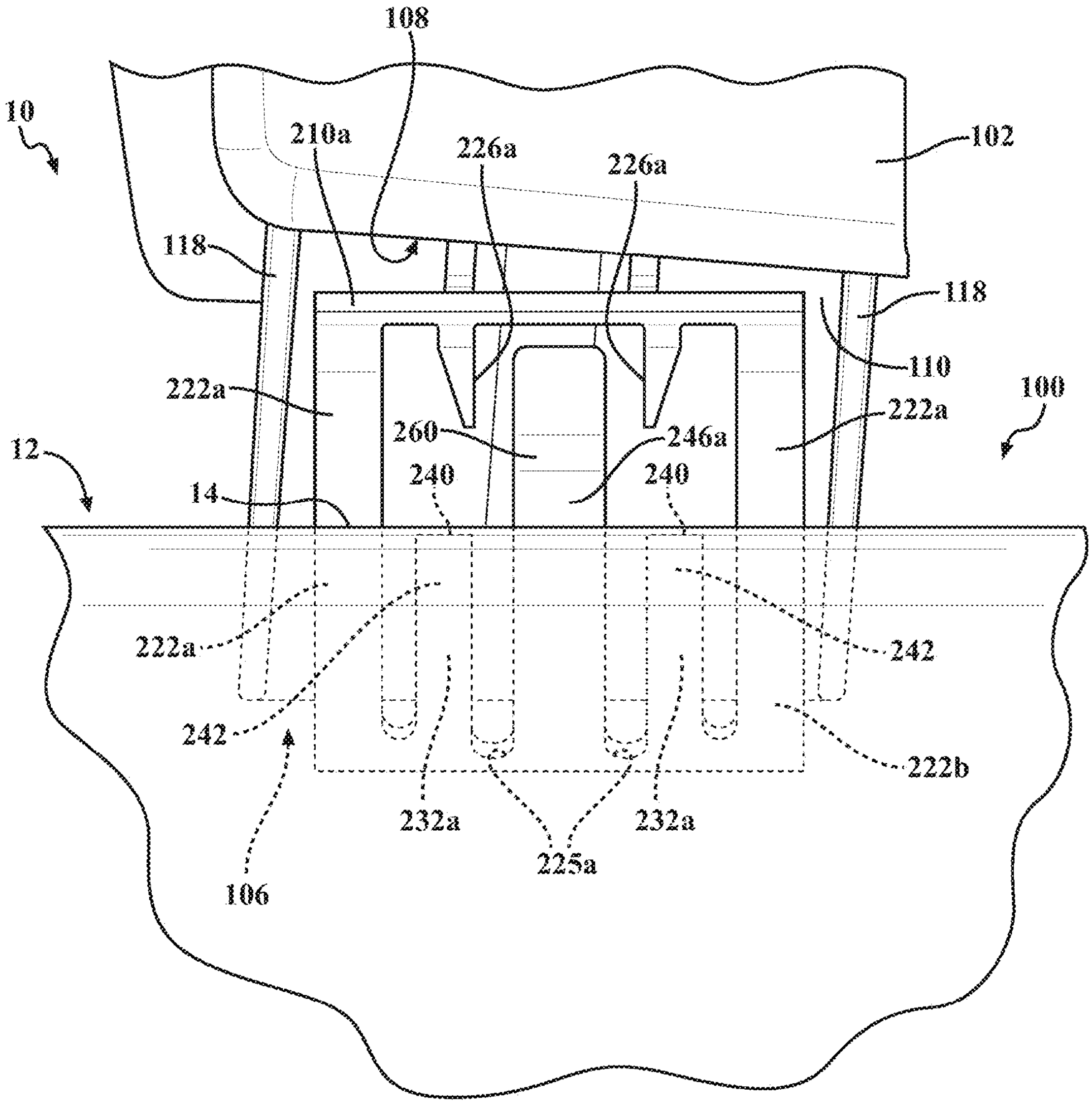
FIG. 5 is a side view of the hard trim assembly and the vehicle component of FIG. 4.
Figure 7:
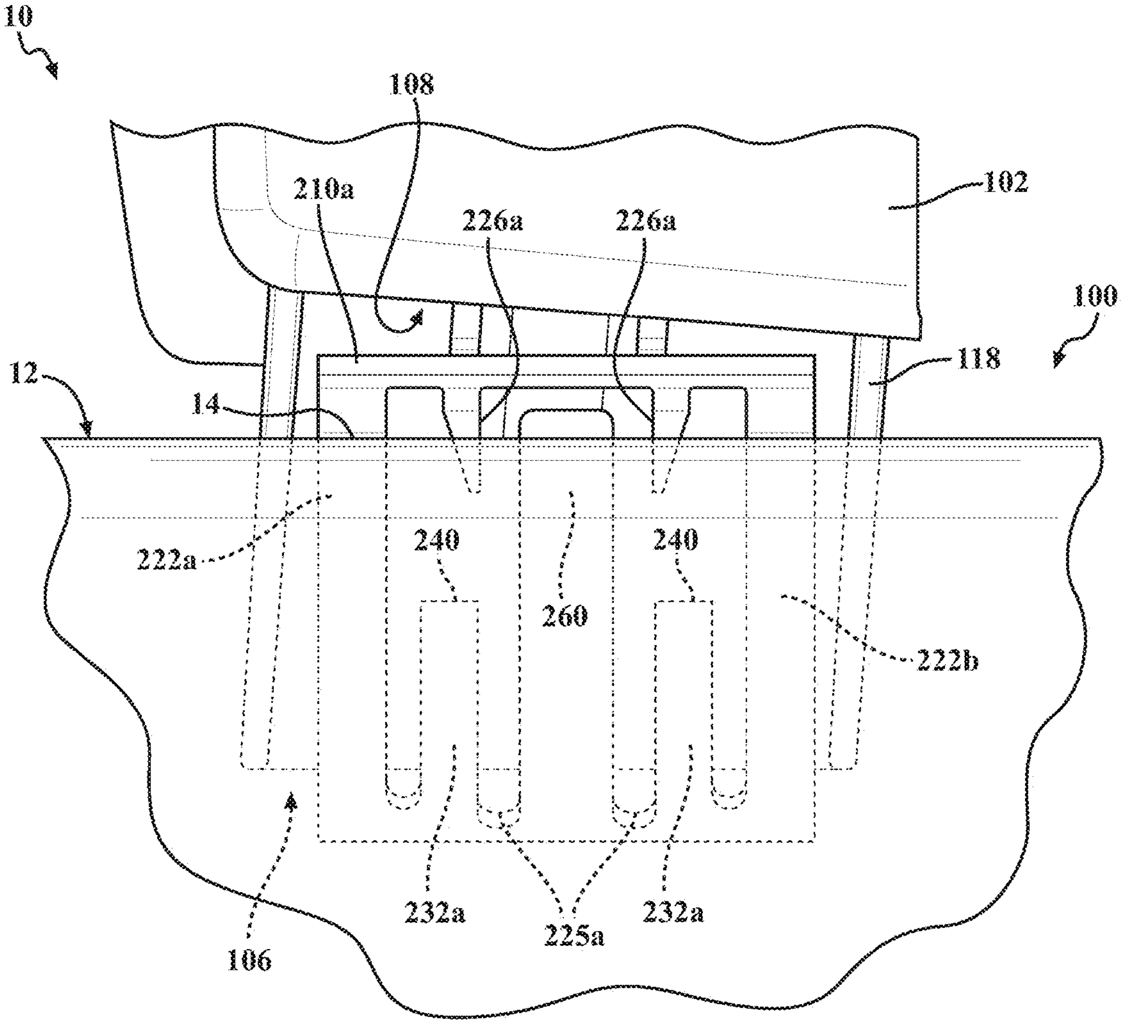
FIG. 7 is a side view of the hard trim assembly and the vehicle component of FIG. 6.

One or more pairs of prongs 226*a*, 226*b* are joined or coupled to the feet 210. Particularly, the pairs of prongs 226*a*, 226*b* are laterally offset from one another and are joined to the inner surfaces 214*a*, 214*b* of the feet 210. The prongs 226*a*, 226*b* depend from the feet 210 toward a central region 228 of the opening 212 and can be tapered to distal ends 230*a*, 230*b* (FIGS. 5 and 7). According to one aspect, the prongs 226*a*, 226*b* can be configured to correspond and/or engage with a portion of the blades 104, such as grooves or openings (not shown) so that the clip 200 cannot be removed from the blade 104 without damaging the clip 200, for example.

With reference again to FIG. 2, one or more second arms 232 are coupled to the head 224 and extend toward the first end 202 of the clip 200. The one or more second arms 232 can include second arms 232*a* that are spaced laterally from each other and coupled to the first surface 225*a* of the head 224. Similarly, the one or more second arms 232 can include second arms 232*b* that are spaced laterally from each other and coupled to the second surface 225*b* of the head 224. According to one aspect, the second arms 232 are cantilevered with respect to the head 224 and are configured to move (e.g., flex, bend, etc.) inwardly toward the central region 228 of the opening 212. With reference to FIG. 3, each of the second arms 232 can include a first segment 234 comprising a proximal end 236 that is joined with or coupled to the head 224. Additionally, each of the second arms 232 can include a second segment 238 coupled to the first segment 234 and have a distal end 240. According to another aspect, each of the second arms 232 can be configured to inhibit removal of the clip 200 with respect to an engagement structure (e.g., a portion of the body 12). For instance, each of the second arms 232 can include a first retention feature or knuckle 242 that is arranged where the first segment 234 joins the second segment 238. The knuckle 242 can be further defined by a bend or angle $\alpha$ between the first segment 234 and the second segment 236, as shown in FIG. 3. The force required to insert the clip 200 into the engagement structure past the knuckle 242 (i.e., to a first position of the clip 200) may be determined and/or modified, at least in part, by the angle $\alpha$. Likewise, a retention force or an amount of force that is required to remove the clip 200 from the body 12 may also be determined and/or modified, at least in part, by the angle $\alpha$. According to another aspect, the first segment 234, the second segment 238, and the knuckle 242 of each of the second arms 232 define a continuous first engagement surface 244. At least a portion of the continuous first engagement surface 244 can contact the body 12 during installation so that the second arms 232 move (i.e., flex, bend, etc.) inwardly toward the central region 228 to allow clip 200 to move to a first position (FIGS. 4 and 5) within the body 12.

With continued reference to FIGS. 2 and 3, one or more third arms 246*a*, 246*b* (i.e., third arms 246) are coupled to the head 224 and extend toward the first end 202 of the clip 200. With reference to FIG. 2, the third arm 246*a* is arranged laterally between the second arms 232*a* and coupled to the first surface 225*a* of the head 224. Similarly, the third arm 246*b* is arranged laterally between the second arms 232*b* and coupled to the second surface 225*b* of the head 224. According to one aspect, the third arms 246 are cantilevered with respect to the head 224 and are configured to move (e.g., flex, bend, etc.) inwardly toward the central region 228 of the opening 212. Each of the third arms 246 includes a first section 248 having a proximal end 250 that is joined with and/or coupled to the head 224. Additionally, each of the third arms 246 includes a second section 252 coupled to the first section 248 and extends toward the first end 202 of the clip 200. Each of the third arms 246 also include a third section 254 having a distal end 256 and is coupled to the second section 252. The third section 254 can have a depressed portion 258 that is arranged between the distal end 256 and where the third section joins the second section 252. According to another aspect, each of the third arms 246 can include a second retention feature 260 that is arranged where the second section 252 joins the third section 254. The second retention feature 260 can be further defined by a bend or angle $\beta$ between the second section 252 and the third section 254, as shown in FIG. 3. The force required to insert the clip 200 into the body 12 past the second retention feature 260 (i.e., to a second position of the clip 200) may be determined and/or modified, at least in part, by the angle $\beta$. According to another aspect, the first section 248, the second section 252, the third section 254, and the second retention feature 260 define a continuous second engagement surface 262. At least a portion of the continuous second engagement surface 262 can contact the body 12 so that the third arms 246 move (i.e., flex, bend, etc.) inwardly toward the central region 228 to allow clip 200 to move to a second position (FIGS. 6 and 7) within the body 12.

According to one aspect, the one or more first arms 222, the one or more second arms 232, the one or more third arms 246, and the laterally offset prongs 226 each move substantially independent from one another. Thus, with reference again to FIG. 1, when the clip 200 is arranged on the blade 104, the one or more first arms 222 may flex outwardly away from the blade 104 as the laterally offset prongs 226*a*, 226*b* respectively contact the first surface 110 and the second surface 112. During installation of the clip 200 on the blade 104, the one or more second arms 232 and the one or more third arms 246 remain generally unaffected and do not move, flex or bend outwardly away from the blade 104.

With reference to FIGS. 4 and 5, the clip 200 is arranged in the first position past the knuckles 242 of the one or more second arms 232*a*, 232*b* within an aperture formed in the body 12 of the vehicle 10. The one or more second arms 232*a*, 232*b* and, more particularly, the knuckles 242 act as a third hand feature that can aid an operator during installation of the hard trim assembly 100 to the body 12 of the vehicle 10. In other words, the knuckles 242 retain the hard trim assembly 100 to a portion of the body 12 of the vehicle 10 and do not allow the clip 200 to be easily removed from the body 12. Thus, as will be discussed below with respect to FIGS. 8 and 9, intermediary assembly steps can be carried out by an operator or machine before the operator applies sufficient force to move the clip 200 to the second position (FIGS. 6 and 7).

Figure 6:
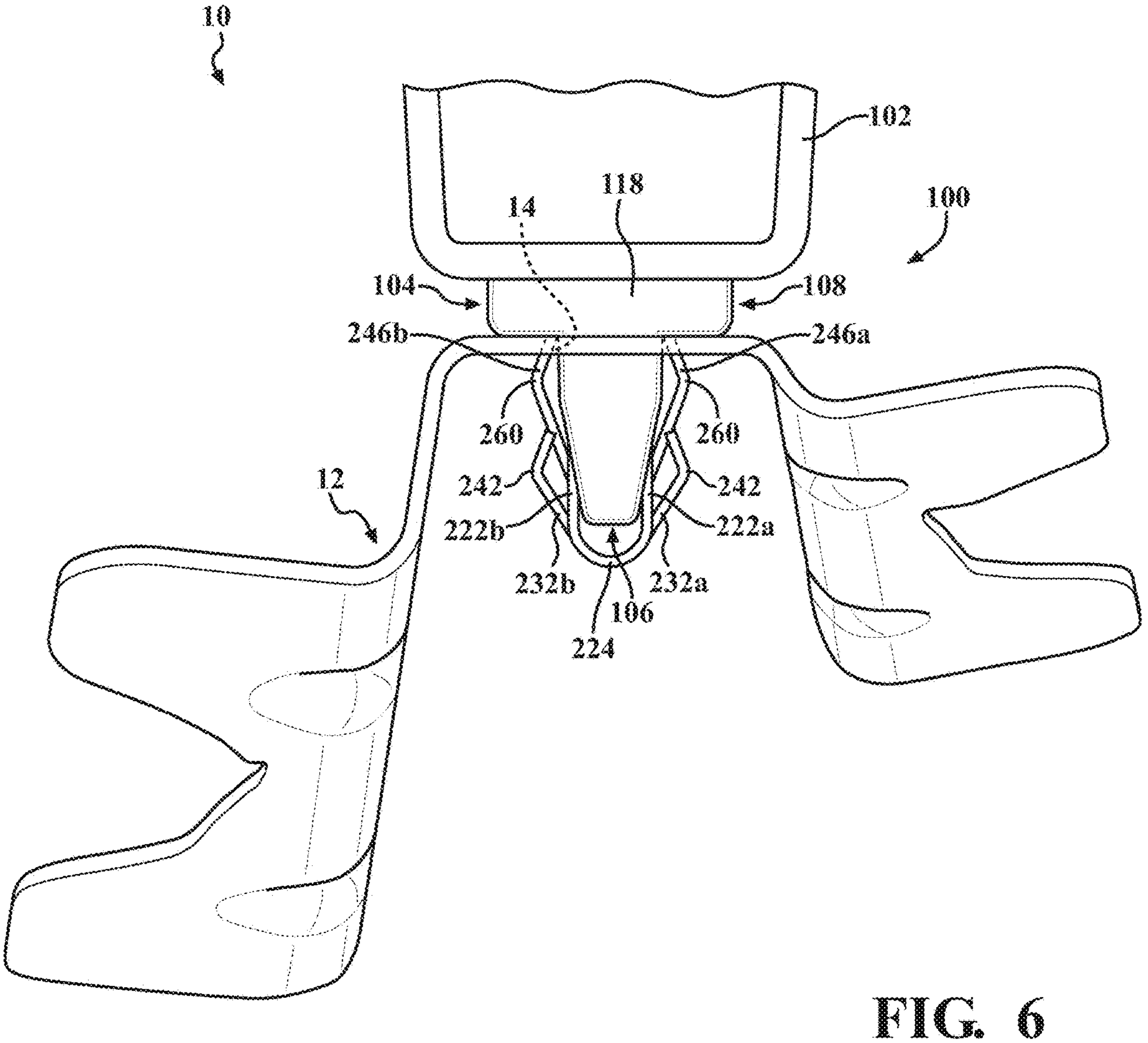
FIG. 6 is an end view of the hard trim assembly of FIG. 1 where a second step of the clip is arranged past an opening of a vehicle component.

With reference to FIGS. 6 and 7, the clip 200 is arranged in the second position past the one or more second retention features 260 of the one or more third arms 246*a*, 246*b* within the aperture of the body 12. The one or more second retention features 260 can help retain the hard trim assembly 100 to a portion of the body 12 and do not allow the clip 200 to be easily removed from the body 12. Note, according to one aspect, the feet 210 can be configured to contact and stop the clip 200 against a portion of the body 12. In other words, a portion of the body 12 may be arranged axially between the lower surfaces 220*a*, 220*b* and the one or more second retention features 260.

Figure 8:
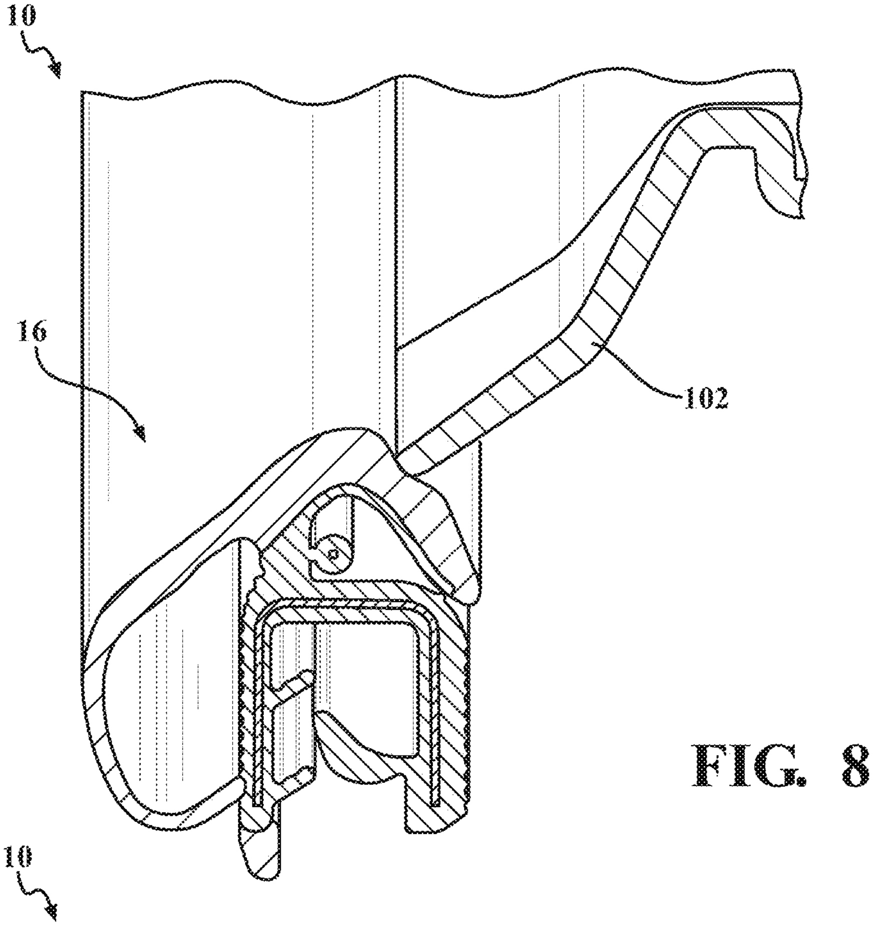
FIG. 8 is a fragmentary cross-sectional view of a hard trim component with respect to a seal when a first step of the clip of FIG. 1 is arranged past an opening of a vehicle component.
Figure 9:
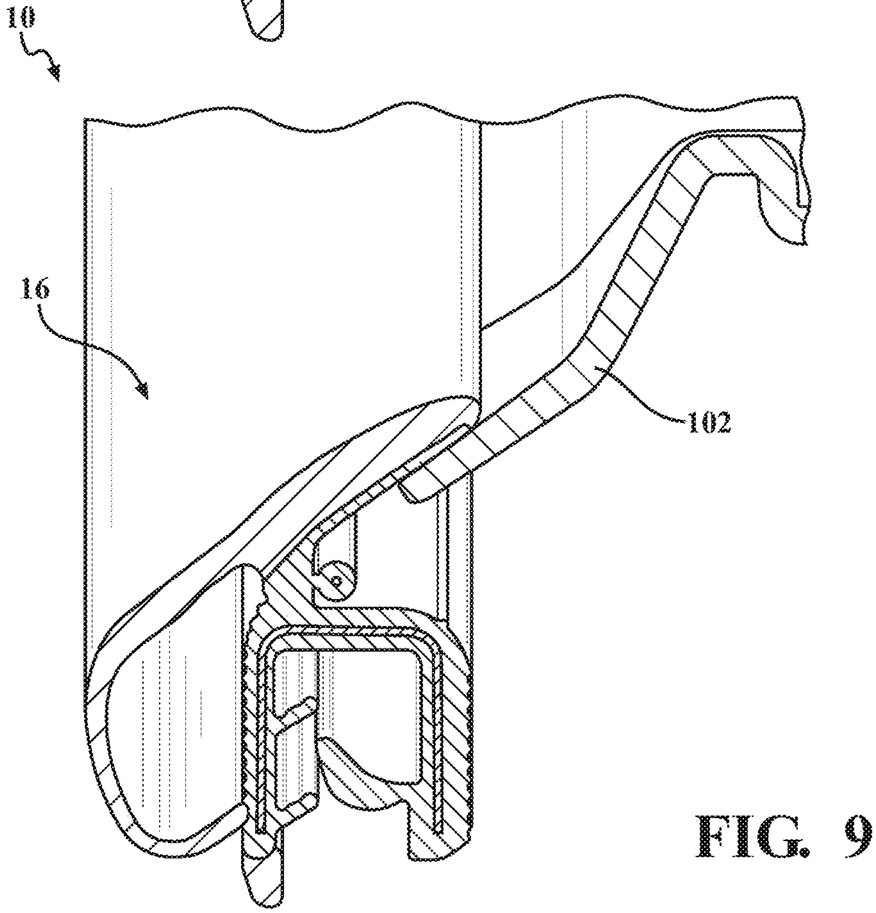
FIG. 9 is a fragmentary cross-sectional view of the harm trim component of FIG. 8 where the seal is pulled over an edge of the hard trim.

In general, installing hard trim components in a vehicle can be challenging due to interferences with seals or other components of the vehicle. Troubleshooting these issues can be time consuming and expensive. The clip 200 is configured to alleviate at least some of the problems associated with installing hard trim or similar components to the body 12 of the vehicle 10. With reference to FIGS. 8 and 9, the clip 200 is not shown but it can be assumed that the clip 200 is in the first position (FIGS. 4 and 5) with respect to the body 12. As shown in FIG. 8, a portion of the panel 102 overlaps a portion of the seal 16. Because the clip 200 is only in the first position, there is more space between the panel 102 and seal 16 than there ordinarily would be if the panel 102 was being installed using one or more one-step clips. Before the operator applies sufficient force to move the clip 200 to the second position, the operator can carry out a pull cord operation to match a lip of the seal 16 to an edge of the panel 102, as shown in FIG. 9. Because the seal 16 is properly located and no longer interfering with the panel 102, the operator can apply force to the panel 102 that does not exceed ergonomic requirements to move the clips 200 to the second position (FIGS. 6 and 7).

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A clip operable in a first position and a second position, the clip comprising:
- one or more first arms extending from one or more feet at a first end and joining a head at a second end;
- one or more second arms coupled to the head and extending toward the first end, the one or more second arms including a first retention feature configured to retain the clip in the first position relative to an engagement structure;
- one or more third arms coupled to the head and arranged laterally between the one or more second arms, the one or more third arms extending toward the first end and including a second retention feature configured to retain the clip in the second position relative to the engagement structure, wherein the clip is configured to move from the first position to the second position relative to the engagement structure in response to an application of force to the clip; and
- one or more pairs of laterally offset prongs joined to the one or more feet at the first end and extending toward the second end.

2. The clip of claim 1, wherein the one or more first arms extend continuously between the one or more feet.

3. The clip of claim 2, wherein the one or more feet extend laterally between the one or more first arms.

4. The clip of claim 1, wherein the one or more second arms are cantilevered with respect to the head and configured to move inwardly toward an opening between the one or more feet.

5. The clip of claim 1, wherein the one or more second arms each comprise:
- a first segment comprising a proximal end coupled to the head, and
- a second segment coupled to the first segment and including a distal end,
- wherein the first retention feature is arranged where the first segment joins the second segment.

6. The clip of claim 5, wherein the first segment, the second segment, and the first retention feature define a continuous first engagement surface.

7. The clip of claim 1, wherein the one or more third arms each comprise:
- a first section comprising a proximal end coupled to the head;
- a second section coupled to and extending from the first section; and
- a third section coupled to the second section and including a depressed portion and a distal end,
- wherein the second retention feature is arranged where the second section joins the third section.

8. The clip of claim 7, wherein the first section, the second section, the third section, and the second retention feature define a continuous second engagement surface.

9. The clip of claim 1, wherein the one or more second arms are configured to inhibit removal of the clip with respect to the engagement structure, and the one or more feet are configured to stop the clip against the engagement structure when the clip is inserted into the engagement structure past a portion of the one or more third arms.

10. The clip of claim 1, wherein the one or more first arms, the one or more second arms, and the one or more third arms each move substantially independent from one another.

11. A hard trim assembly comprising:

a panel comprising at least one blade; and at least one clip arranged on the at least one blade and operable in a first position and a second position, the at least one clip comprising:

one or more first arms extending from one or more feet at a first end and joining a head at a second end, one or more second arms coupled to the head and extending toward the first end, the one or more second arms including a first retention feature configured to retain the at least one clip in the first position relative to the at least one blade, one or more third arms coupled to the head and arranged laterally between the one or more second arms, the one or more third arms extending toward the first end and including a second retention feature configured to retain the at least one clip in the second position relative to the at least one blade, wherein the at least one clip is configured to move from the first position to the second position relative to the at least one blade in response to an application of force on the at least one clip, and one or more pairs of laterally offset prongs joined to the one or more feet at the first end and extending toward the second end.

12. The hard trim assembly of claim 11, wherein the one or more second arms each comprise:

a first segment comprising a proximal end coupled to the head, and a second segment coupled to the first segment and including a distal end, wherein the first retention feature is arranged where the first segment joins the second segment.

13. The hard trim assembly of claim 12, wherein the first segment, the second segment, and the first retention feature define a continuous first engagement surface.

14. The hard trim assembly of claim 11, wherein the one or more third arms each comprise:

a first section comprising a proximal end coupled to the head, a second section coupled to and extending from the first section, and a third section coupled to the second section and including a depressed portion and a distal end, wherein the second retention feature is arranged where the second section joins the third section.

15. The hard trim assembly of claim 14, wherein the first section, the second section, the third section, and the second retention feature define a continuous second engagement surface.

16. A vehicle comprising:

a vehicle body comprising one or more openings;

a panel comprising at least one blade; and at least one clip arranged on the at least one blade and operable in a first position and a second position, the at least one clip comprising:

one or more first arms extending from one or more feet at a first end and joining a head at a second end, one or more second arms coupled to the head and extending toward the first end, the one or more second arms having a first retention feature configured to retain the at least one clip in the first position relative to the at least one blade, one or more third arms coupled to the head and arranged laterally between the one or more second arms, the one or more third arms extending toward the first end and having a second retention feature configured to retain the at least one clip in the second position relative to the at least one blade, wherein the at least one clip is configured to move from the first position to the second position relative to the at least one blade in response to an application of force on the at least one clip, and one or more pairs of laterally offset prongs joined to the one or more feet at the first end and extending toward the second end.

17. The vehicle of claim 16, wherein the one or more second arms each comprise:

a first segment comprising a proximal end coupled to the head, and a second segment coupled to the first segment and including a distal end, wherein the first retention feature is arranged where the first segment joins the second segment.

18. The vehicle of claim 17, wherein the first segment, the second segment, and the first retention feature define a continuous first engagement surface.

19. The vehicle of claim 16, wherein the one or more third arms each comprise:

a first section comprising a proximal end coupled to the head, a second section coupled to and extending from the first section, and a third section coupled to the second section and including a depressed portion and a distal end, wherein the second retention feature is arranged where the second section joins the third section.

20. The vehicle of claim 19, wherein the first section, the second section, the third section, and the second retention feature define a continuous second engagement surface.

* * * * *